3,385,657
VINYL ETHER POLYMERIZATION CATA-
LYSTS COMPRISING ALKALINE EARTH
METAL HALIDES
Roland J. Kern, Hazelwood, Mo., assignor to Monsanto
Company, a corporation of Delaware
No Drawing. Original application June 18, 1962, Ser. No.
202,982, now Patent No. 3,252,953, dated May 24,
1966. Divided and this application Mar. 30, 1965, Ser.
No. 456,588
4 Claims. (Cl. 23—88)

ABSTRACT OF THE DISCLOSURE

Vinyl ethers are polymerized by contacting the vinyl ether with at least a catalytic amount of a catalyst of the formula MXF, M being an alkaline earth metal chosen from magnesium, calcium, strontium and barium, and X is a halogen. The catalyst is prepared by reaction of a fluorinating agent with a fluorine free alkaline earth metal dihalide.

---

This application is a division of the applicant's copending application Ser. No. 202,982, filed June 18, 1962, now United States Patent 3,252,953, issued May 24, 1966.

This invention relates to the process for the polymerization of vinyl ethers to prepare solid polymers of high molecular weight. The process of this invention can be used to synthesize polymers characterized by a stereospecific arrangement of the side chain substituents along the carbon-carbon polymer "backbone."

This invention relates to the polymerization of vinyl ethers to form solid polymers of high molecular weight by the use of novel alkaline earth metal halide catalysts containing fluoride as at least part of the halide content of said catalysts.

An object of this invention is to prepare crystalline polymers of vinyl ethers by the use of heterogeneous catalysis.

The preparation of homopolymers of vinyl alkyl ethers has generally been carried out with the use of Friedel-Crafts catalysts or with acid-reacting condensing agents. Polymerization with these catalysts, however, gives only liquid products, unless a critical low temperature is maintained during the reaction. For example, U.S. 2,104,000 teaches the use of boron halides at a recommended temperature of between 40° and 60° C. Polyvinyl alkyl ethers prepared at these temperatures with an active catalyst, such as a boron halide, are exclusively viscous liquid products.

Vinyl isopropyl ether polymerizes explosively at 40° C. in the presence of a boron halide catalyst and sticky, viscous, balsam-like products are obtained; with the same monomer and catalyst the reaction proceeds with explosive violence even if the temperature is reduced to below −10° C.

When the polymerization process of U.S. 2,104,000 is used to prepare polyvinyl methyl ether at a temperature of about 10° C., and above the polymer ranges from liquid to semi-solid.

The process of U.S. 2,799,669 teaches the polymerization of vinyl alkyl ethers using acid-reacting condensing agents as catalysts at temperatures preferably between −60 and −70° C. To prepare solid, form-stable polymers by the process taught in this patent, the polymerization must be conducted at these extremely low temperatures.

Generally the catalysts employed in the prior art to polymerize vinyl alkyl ethers can be classified as homogeneous, or soluble, polymerization catalysts, whereas the catalysts of the present invention are operative as heterogeneous, or insoluble, materials. It is well-recognized by those skilled in the art that the mechanisms of polymerization, and thus the properties of the polymer produced, depend on the physical nature of the catalyst, i.e., whether it is classified as homogeneous or heterogeneous.

I have discovered that the alkaline earth metal fluorides and the alkaline earth metal halofluorides, prepared as I have set forth herein, catalyze the polymerization of vinyl ethers at mild temperatures to solid, high molecular weight, crystalline polymers, having an appreciable stereospecific polymer content.

Although there are applications for the gummy, semisolid, polyvinyl alkyl ethers, such as adhesive compositions, there are also many applications for which these type materials are totally unsuitable. By the practice of my invention, polyvinyl ethers are prepared that can be used in the molding, pressure-casting and extrusion fields. Thus, I have prepared polymers that can be rolled or pressed into thin sheets for use in lamination work or for use as wrapper films, or for container coatings. These solid, crystalline products can be used as electrical insulators and they have applications as bases for pressure-sensitive surgical and transparent tapes. These polyvinyl ethers can also be blended with other polymers, for example, with polystyrene, polyethylene, polyvinyl chloride, etc. to prepare new compositions having the desirable properties of each constituent in said blend.

Vinyl ethers suitable as monomers for practicing my invention have the formula $CH_2=CHOR$, where R is an alkyl radical, haloalkyl radical or haloaryl radical. Examples of suitable monomers are vinyl methyl ether, vinyl ethyl ether, vinyl propyl ether, vinyl allyl ether, vinyl isopropyl ether, vinyl butyl ether, vinyl isobutyl ether, vinyl tert. butyl ether, vinyl pentyl ether, vinyl hexyl ether, vinyl cyclohexyl ether, vinyl heptyl ether, vinyl benzyl ether, vinyl octyl ether, vinyl 2-ethylhexyl ether, vinyl nonyl ether, vinyl decyl ether, vinyl dodecyl ether, vinyl tridecyl ether, and vinyl tetradecyl ether. When R in the general formula is a haloalkyl radical, the monomer can be vinyl β-chloroethyl ether, vinyl β-bromoethyl ether, vinyl β-iodoethyl ether, vinyl 2,2,2-trichloroethyl ether, vinyl 2,2,2-tribromoethyl ether, and when R is a haloaryl radical the monomer can be vinyl o-chlorophenyl ether, vinyl m-chlorophenyl ether, vinyl p-chlorophenyl ether, vinyl m-bromophenyl ether, vinyl 2,4-dichlorophenyl ether, vinyl 2,4,6-trichlorophenyl ether, or vinyl pentachlorophenyl ether.

Monomers suitable for the practice of my invention can be classified as vinyl alkyl ethers, vinyl haloalkyl ethers, or vinyl haloaryl ethers. I can employ vinyl alkyl ethers wherein the alkyl radical contains from 1 to 14 carbon atoms, also vinyl haloalkyl ethers wherein the haloalkyl group contains 1 to 10 carbon atoms and 1 to 3 halogen atoms, each of which has an atomic weight of at least 35, e.g., chlorine, bromine, or iodine, and also vinyl haloaryl ethers wherein the haloaryl group contains 6 to 10 carbon atoms and 1 to 5 halogen atoms having an atomic weight of at least 35, e.g., chlorine, bromine, or iodine.

The alkyl substituent in the monomer molecule can be either a straight chain radical or a highly branched radical. A suitable monomer can be prepared by the reaction of acetylene with methanol, ethanol, n-butanol, n-hexanol, n-dodecanol or n-tetradecanol as representative examples. Vinyl branched-chain ethers can be prepared by the reaction of acetylene with isopropanol, isobutanol, 2-ethyl hexanol, and 3,5,5-trimethyl nonanol, for example. Branched-chain alcohols prepared by the Oxo process from an olefin, carbon monoxide, and hydrogen can similarly be used to prepare suitable monomers for the practice of my invention, e.g., alcohols from nonene, propylene tetramer, triisobutylene, and diisobutylene, can be converted to the corresponding vinyl alkyl ether having a highly branched alkyl chain.

Catalysts effective in polymerizing vinyl ethers to crystalline, solid polymers, according to my invention, are prepared by the action of certain fluorinating agents upon alkaline earth metal dihalides under anhydrous conditions. The halides of alkaline earth metals suitable as initial reactants for the preparation of my catalytic materials include the chlorides, bromides and iodides of magnesium, calcium, strontium and barium. Thus, magnesium dichloride can be converted to magnesium chlorofluoride, magnesium difluoride, and mixtures of the two.

The fluorination reaction is an essential step in the preparation of my active stereospecific polymerization catalysts, since the alkaline earth metal fluorides of commerce are unsatisfactory as polymerization catalysts. The fluorination step can be conducted by the employment of an organic fluorine-containing compound in those rare instances where the alkaline earth metal halide is soluble in an inert solvent, but for general purposes I prefer to employ anhydrous hydrogen fluoride. The complete conversion of the alkaline earth metal chloride, bromide, or iodide to the reactive fluoride can be conducted by contacting said chloride, bromide or iodide with excess hydrogen fluoride under anhydrous conditions. Liquid hydrogen fluoride can be employed at low temperatures to insure efficient contact of the reacting materials; the temperature is then gradually increased to boil off excess hydrogen fluoride and by-product hydrogen halide; i.e., hydrogen chloride, hydrogen bromide, hydrogen iodide. It is, of course, understood that excess hydrogen fluoride is not employed when one wishes to obtain the partial fluoride, i.e., halofluoride. In those instances a calculated quantity of hydrogen fluoride is metered or weighed into the reactor to bring about the preparation of a halofluoride, e.g., magnesium chlorofluoride, calcium bromofluoride, magnesium iodofluoride, strontium chlorofluoride, barium bromofluoride, calcium chlorofluoride, magnesium bromofluoride.

The catalysts useful in the instant process can be characterized by the general formula, MXF, wherein M is an alkaline earth metal, e.g., magnesium, calcium, strontium, or barium, and X is a halogen atom.

In the reaction of the alkaline earth metal dihalide with the fluorinating agent, the amount of fluorine introduced into the catalyst molecule depends upon the mole ratio of initial reactants. For example, if magnesium dichloride is treated with excess hydrogen fluoride, the product produced is exclusively magnesium difluoride; however, as the mole proportion of hydrogen fluoride is reduced, a mixture of magnesium difluoride and magnesium chlorofluoride is produced. Still further reduction of hydrogen fluoride results in the production of higher proportions of the magnesium chlorofluoride. For optimum production of stereospecific polymer of vinyl ether, I prefer to convert all of the alkaline earth metal dihalide to the alkaline earth metal difluoride.

For convenience in isolating and purifying the polymers produced by my process, it is desirable to conduct the polymerization in the presence of a low concentration of catalyst. However, the catalyst concentration must be balanced against reaction time to avoid excessive time cycles. I can employ a catalyst concentration ranging from 0.05 to about 10 millimoles (mmoles) per liter of reaction mixture, and 0.1 to about 1 mmole is suitable for most purposes. It will be understood that the operable and optimum concentrations vary with the polymerization temperature and with the concentration of monomer in diluent, but selection of catalyst concentration is readily determined by those skilled in the art.

In practicing my invention I have found that inert diluents can be used, if desired, in the polymerization of the various vinyl ethers. The diluent has some utility in controlling the rate and temperature of reaction and it tends to prevent the deposition of solid polymer upon the stirring apparatus and walls of the reactor. This inert diluent is then useful in separating the desired polymer from the catalyst during the product isolation step. Saturated aliphatic hydrocarbons, for example, hexane, octane, nonane, decane, etc., aromatic compounds, e.g., benzene toluene, xylene, and halogenated hydrocarbons, such as methylene chloride, chloroform, and carbon tetrachloride can be used as inert diluents.

The practice of my invention is not limited to intermittent or batch-type operation, but is adaptable to continuous procedures as well. The catalyst described herein can be deposited on an inert carrier, e.g., alumina, carbon, silica or asbestos or mixtures thereof and the vinyl ether passed over the catalyst. If desired, the catalyst suspended in an inert diluent can be fed concomitantly with the monomer into the polymerization chamber. Other aspects of continuous operation will be obvious to those skilled in the art. For example, since one form of preferred catalyst is a fine powder that flows like liquid, the polymerization reactor can be modified so that catalyst and monomer can be fed concomitantly into the reactor containing an inert hydrocarbon liquid as diluent.

A particular advantage of my invention is that the process of polymerization does not depend upon a critical narrow range of temperature for operability. I prefer to carry out the reaction at a temperature from about $-60°$ to about $100°$ C., preferably from about $-40°$ to about $50°$ C. Operation at about room temperature provides convenience in controlling the reaction rate. Previous investigators have shown the polymerization to be somewhat unpredictable and runaway reactions were commonplace. By the use of my invention the polymerization is easily controllable and elaborate cooling means are generally unnecessary.

Polymerization is maintained at a desirable and economical rate by removing the heat of reaction and by adjusting the flow of monomer and catalyst to the reactor.

The polymers prepared by my invention have characteristic properties not possessed by the polyvinyl ether polymers of the prior art. My polymer products have a high degree of crystallinity when prepared and, furthermore, my polymers give a crystalline X-ray diffraction pattern when examined as fiber or film, without prior orientation, as by stretching, for example. The polymers can be characterized by their steric structure involving the spacial arrangement of the groups attached to the polymeric chain through the ether linkages. Polymers prepared by my process have a stereospecific arrangement of these side groups. The percentage of stereospecificity possessed by the polymers varies with the method of catalyst preparation, the nature of the diluent or solvent employed for the polymerization, and the temperature of polymerization. The effects of these process variables will be better understood by reviewing the examples described herein.

In order to illustrate some of the various aspects of the invention and to serve as a guide in the application of this invention, the following examples are given. It will, of course, be understood that variations from the particular temperatures, pressures, diluents and proportions can be made without departing from the invention.

Example 1

The apparatus for the preparation of the novel catalysts useful in the instant process was constructed of a one-half inch copper tube shaped in the form of a U. One end of this tubing was connected to a Y tube to which was connected a cylinder of hydrogen fluoride and the other end of the Y tube was connected to a source of dry nitrogen containing a manometer in parallel. The copper tubing was thoroughly dried and charged with the anhydrous alkaline earth metal halide which had been preheated to $100°$ C. under vacuum to remove trace quantities of moisture, and then cooled in an atmosphere of dry nitrogen. A quantity of about 2 grams of the alkaline earth metal halide was placed in the copper tubing and a flow of dry nitrogen adjusted to maintain a slight positive pressure through the system. The reaction tube was then cooled in a Dry-Ice bath and hydrogen fluoride condensed into the tube until the manometer in the nitrogen line indicated that gas passage was being blocked by the condensing liquid hydrogen fluoride. The flow of the hydrogen fluoride was then discontinued and the Dry-Ice cooling bath removed. As the temperature slowly climbed, by-product hydrogen halide and excess hydrogen fluoride were boiled away. A positive flow of the anhydrous nitrogen gas was maintained over the catalytic product and the exit gas was passed through a solution of aqueous silver nitrate to determine when all of the by-product hydrogen halide had been removed. At this point a few, small, stainless steel balls were dropped into the reactor and the reactor vibrated by an electrically driven vibrator to pulverize the catalytic product. The reactor system was swept with the dry nitrogen gas until the excess hydrogen fluoride had been removed and the product, a free-flowing, finely-divided powder was bottled in polyethylene vials. The constitution of the catalytic product was determined by chemical analysis.

Example 2

A thoroughly dried 500 ml. glass polymerization reactor fitted with an electric motor-driven stirring device was charged with 225 ml. hexane which had been passed through a column of molecular sieves, 25 ml. methylene chloride which had been freshly distilled, and 50 ml. vinyl isobutyl ether which had been washed with ice water, dried over calcium chloride, and then distiled over a calcium hydride. The solution was cooled to −40° C. and 0.17 gram magnesium difluoride added. The catalyst used in this run was prepared according to the procedure of Example 1 and its chemical composition, $MgF_2$, confirmed by chemical analysis. The reaction mixture was maintained at a temperature ranging between −30° C. and −40° C. for one hour and then a second addition of magnesium fluoride, 0.22 gram made. After a total reaction period of one hour and forty-five minutes the mixture became very viscous and the temperature climbed to −20° C. Mixing was continued for a total reaction period of four hours and fifteen minutes and then the catalyst was quenched by the addition of 2 ml. pyridine, and the product precipitated by the addition of excess methanol. The polymer was extracted several times with boiling methanol, filtered and dried overnight in a vacuum oven maintained at 40° C. The white, tough, non-tacky polymer which was obtained weighed 38.2 grams, and had a specific viscosity of 0.152 measured for a 0.1% solution in chloroform at 25° C. The product gave a crystalline X-ray diffraction pattern and a study of the material by infrared absorption measurements indicated that it contained an appreciable quantity of stereospecific polymer.

Example 3

A glass polymerization reactor was charged with 225 ml. hexane which had been purified by passage through a column packed with molecular sieves, 25 ml. freshly distilled methylene chloride, and 50 ml. vinyl n-butyl ether which had been purified by first stripping off low boiler, washing with water four times at room temperature and drying over calcium chloride and then distilling from silica gel. The solution was cooled to −40° C. and 0.8 gram calcium fluoride added over a period of 10 minutes. The catalyst used in this run was prepared according to the procedure of Example 1 by the fluorination of anhydrous calcium chloride. The polymerization reaction proceeded rapidly and was continued for 45 minutes at a temperature ranging between −40° C. and +10° C., then the catalyst was quenched by the addition of 2 ml. pyridine. The product mass was poured into excess methanol, filtered and extracted three times with hot methanol. The solid, somewhat tacky polymer was dried in a vacuum oven for 16 hours at 50° C. The weight of material obtained amounted to 36.5 grams, and had a specific viscosity of 0.125 measured for a 0.1% solution in chloroform at 25° C.

Example 4

For this polymerization run, strontium fluoride, $SrF_2$, prepared by the fluorination of anhydrous strontium chloride according to the procedure of Example 1, was used as a polymerization catalyst.

The dry polymerization reactor was charged with a solvent mixture of 225 ml. hexane and 25 ml. methylene chloride, purified as described in Example 2. To this solvent mixture was added 50 ml. of vinyl isobutyl ether which had been purified by washing with cold water, drying over calcium chloride and then by distillation of calcium hydride. The solution was cooled to −30° C. and the finely-divided strontium chloride catalyst, 0.4 gram, added in small portions over a period of 20 minutes. The polymerization proceeded fairly rapidly at −30, ±5° C. and was continued for 2 hours and 45 minutes, during which time the solution became extremely viscous. The catalyst was quenched by the addition of 1 ml. pyridine and the polymer precipitated by the addition of excess methanol. The polymer was filtered, thoroughly washed with methanol and extracted three times with hot methanol before drying in the vacuum oven at +50° C. for 16 hours. The product, weight 36.7 g., was a translucent, solid, somewhat tacky polymer.

Example 5

In several previous preparations of calcium fluoride, calcium chloride pellets were charged to the fluorination tube without prior drying. The calcium chloride used was an anhydrous grade but the catalyst produced, although active, gave polymers of vinyl alkyl ethers having a tacky characteristic. The catalyst used for this run was the same grade of calcium chloride, anhydrous, but had been ground to a fine powder and dried under vacuum for 8 hours at 100° C. The fluorination step followed the general procedure as described in Example 1.

The polymerization reactor was charged with 225 ml. purified hexane, 25 ml. freshly distilled methylene chloride, and 50 ml. vinyl isobutyl ether which had been washed with cold water, dried over calcium chloride and distilled from calcium hydride. The monomer solution was cooled to −25° C. and an addition of 0.47 g. calcium fluoride catalyst, prepared from thoroughly dried calcium chloride according to the procedure of Example 1, was added at one time. Although the polymerization reaction appeared to be exothermic, the temperature was maintained at −25° C., ±5° C. and the polymerization continued for a period of 2 hours and 15 minutes, during which time the mixture became viscous and opaque. The catalyst was quenched with 2 ml. pyridine and the polymer precipitated in methanol, filtered and extracted three times with hot methanol before drying in a vacuum oven for 16 hours at 40° C. The polymer obtained in this run was a stiff, white material weighing 37.5 g. and had no tacky characteristics. It had a specific viscosity of 0.25, measured for a 0.1% solution in chloroform at 25° C. This product contained a comparatively high level of stereospecific, isotactic polymer as determined by infrared absorption studies and extraction tests using methyl ethyl ketone as a solvent.

Example 6

The polymerization reactor was charged with 225 ml. hexane and 25 ml. methylene chloride purified according to the procedure of Example 2. An addition of 50 ml. vinyl normal butyl ether was then made. This monomer had been purified by washing with ice water, drying over calcium chloride, and then fractionating from calcium hydride. The solution was cooled to −30° C. and an addition of 0.3 g. of magnesium fluoride, prepared according to the procedure of Example 1, was then made. The polymerization was conducted for 4 hours at −30° C. during which time the mixture became very stiff and difficult to stir efficiently. The catalyst was quenched by the addition of 2 ml. pyridine and the polymer precipitated in excess methanol and then extracted with three portions of hot methanol. The product obtained in this run, after drying for 16 hours in a vacuum oven at 40° C., weighed 38 g. and had a specific viscosity of 0.264 measured for a 0.1% solution in chloroform at 25° C.

Example 7

The catalyst used in this run was prepared by fluorinating anhydrous, vacuum-dried strontium bromide, using liquid hydrogen fluoride as described in Example 1.

The polymerization reactor was charged with 225 ml. hexane, 25 ml. methylene chloride, and 50 ml. vinyl isobutyl ether. The solvents and monomer used in this run were purified according to the procedure as described in Example 2. While the monomer solution held at −30° C., an addition of 0.36 g. strontium fluoride was made with thorough mixing being employed. The polymerization reaction proceeded slowly for 2 hours at −20 to −30° C. so that an addition of 0.36 g. strontium fluoride catalyst was made. As soon as this second addition of catalyst was made the polymerization proceeded at a much more rapid rate and the temperature rose to −11° C. and was returned to −20° C. by external cooling. The total time of polymerization was 2 hours and 45 minutes and the catalyst was quenched by addition of 2 ml. pyridine and the polymer precipitated in methanol, exrtracted with several portions of boiling methanol and dried in a vacuum oven for 16 hours at 40° C. The total weight of polymer recovered in this run was 37.7 grams of which 84.5% was soluble in acetone and in hexane, 15.5% was insoluble in acetone and also in hexane. The specific viscosity of the overall polymer produced in this run was 0.06 measured for 0.1% solution in chloroform at 25° C. The extraction studies carried out above and with methyl ethyl ketone together with examination of this product by infrared absorption indicate that a substantial portion of the polymer chains contained a stereospecific arrangement of the side chains attached to the polymer backbone.

Example 8

A sample of the identical magnesium fluoride used in the polymerization run described in Example 2 above was heated to 100° C. in a stream of anhydrous nitrogen gas. This step was conducted to determine whether the polymerization activity of the magnesium fluoride might be due to hydrogen fluoride absorbed from the catalytic surface. After heating had been conducted for one hour at 100° C. the catalyst was permitted to cool to room temperature while maintaining the flow of dry nitrogen over the catalyst.

The procedure and charge of Example 2 above was repeated with the sole exception being that the catalyst, anhydrous magnesium fluoride, had been pretreated by heating to 100° C. The product polymer obtained in this run weighed 30.2 grams, was quite stiff and nontacky, and had a specific viscosity of 0.072 measured for a 0.1% solution in chloroform at 25° C. It was determined that 10% of the product polymer was insoluble in hexane, while the remaining 90% was hexane-soluble. Further solubility studies with methyl ethyl ketone indicated that this product exhibited a substantial degree of stereospecificity. The substantial degree of stereospecificity obtained was further confirmed by infrared absorption studies and by a crystalline pattern when examined by X-ray diffraction technique.

While the invention has been described with particular reference to preferred embodiments thereof, it will be appreciated that variations from details given herein can be effected without departing from the invention in its broadest aspects.

I claim:

1. A polymerization catalyst of the formula MXF, wherein M is an alkaline earth metal selected from the group consisting of magnesium, calcium, strontium and barium, and X is a halogen, said catalyst being prepared by the reaction of an alkaline earth metal dihalide wherein the halide is selected from the group consisting of chloride, bromide and iodide with a fluorinating agent.

2. The polymerization catalyst according to claim 1 wherein the catalyst is an alkaline earth metal difluoride.

3. The polymerization catalyst according to claim 1 wherein the catalyst is magnesium difluoride.

4. The polymerization catalyst according to claim 1 wherein the catalyst is calcium difluoride.

References Cited

UNITED STATES PATENTS 3,252,953   5/1966   Kern.

JOSEPH L. SCHOFER, *Primary Examiner.*

H. WONG, *Assistant Examiner.*